US012732449B2

(12) United States Patent
Davis et al.

(10) Patent No.: US 12,732,449 B2
(45) Date of Patent: Sep. 8, 2026

(54) TECHNIQUES FOR IDENTIFYING OPTIMAL ROUTING PATHS FOR PERFORMING TRANSACTIONS BETWEEN NODES

(71) Applicant: Amboss Technologies, Inc., Nashville, TN (US)

(72) Inventors: Vincent Davis, Forest City, NC (US); Vikash Singh, San Francisco, CA (US); Jesse Shrader, Nashville, TN (US); Anthony Potdevin, Bogotá (CO)

(73) Assignee: Amboss Technologies, Inc., Portland, OR (US)

( * ) Notice: Subject to any disclaimer, the term of this patent is extended or adjusted under 35 U.S.C. 154(b) by 106 days.

(21) Appl. No.: 18/793,494

(22) Filed: Aug. 2, 2024

(65) Prior Publication Data

US 2026/0039581 A1 Feb. 5, 2026

(51) Int. Cl.
*G06F 13/00* (2006.01)
*G06Q 20/22* (2012.01)
*H04L 45/12* (2022.01)

(52) U.S. Cl.
CPC ........... *H04L 45/12* (2013.01); *G06Q 20/223* (2013.01)

(58) Field of Classification Search
CPC .............................. H04L 45/12; G06Q 20/223
USPC ......................... 709/238, 224, 239–243, 200
See application file for complete search history.

(56) References Cited

U.S. PATENT DOCUMENTS

| | | | | |
|---|---|---|---|---|
| 8,432,848 B2 * | 4/2013 | Mehta | .................. | H04B 7/2606 370/429 |
| 9,083,420 B2 * | 7/2015 | Mehta | ..................... | H04W 8/04 |
| 2010/0296432 A1 * | 11/2010 | Mehta | .................. | H04B 7/2606 370/392 |
| 2014/0087651 A1 * | 3/2014 | Heo | ......................... | H04B 7/14 455/7 |
| 2025/0168102 A1 * | 5/2025 | Cho | ...................... | H04L 45/121 |

* cited by examiner

*Primary Examiner* — Kenneth R Coulter

(74) *Attorney, Agent, or Firm* — Dickinson Wright PLLC; Jonathan H. Harder

(57) ABSTRACT

Disclosed herein are techniques for identifying routing paths between nodes. According to some embodiments, a method can include the steps of (1) receiving, from a client computing device, a request for a routing path between a source node, at least one intermediate node, and a destination node, wherein the request references the source and destination nodes, and includes at least one transaction parameter, (2) referencing the request against at least one simulation graph to identify a plurality of candidate routing paths, (3) identifying the routing path among the plurality of candidate routing paths, and (4) providing the routing path to the client computing device to enable the client computing device to effect a transaction facilitated by the source node, the at least one intermediate node, and the destination node, in accordance with the routing path and the at least one transaction parameter.

20 Claims, 5 Drawing Sheets

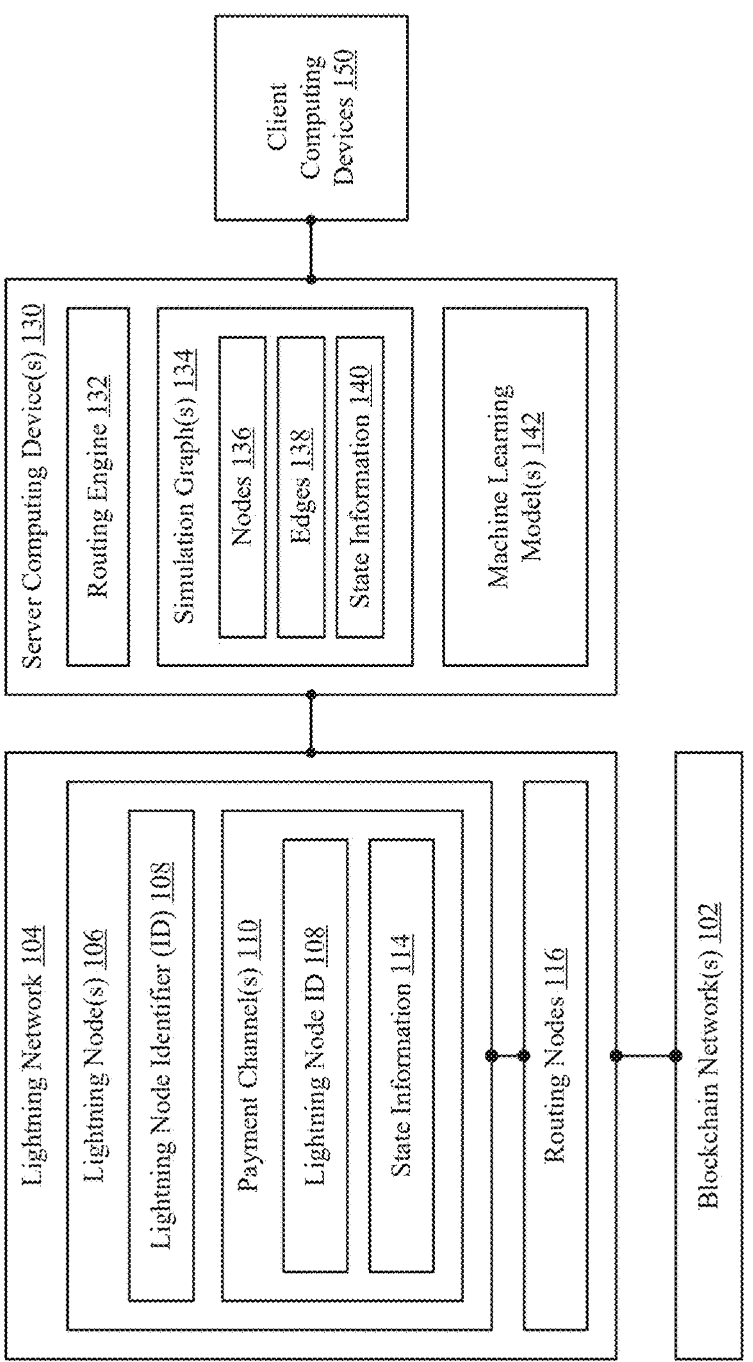
FIG. 1

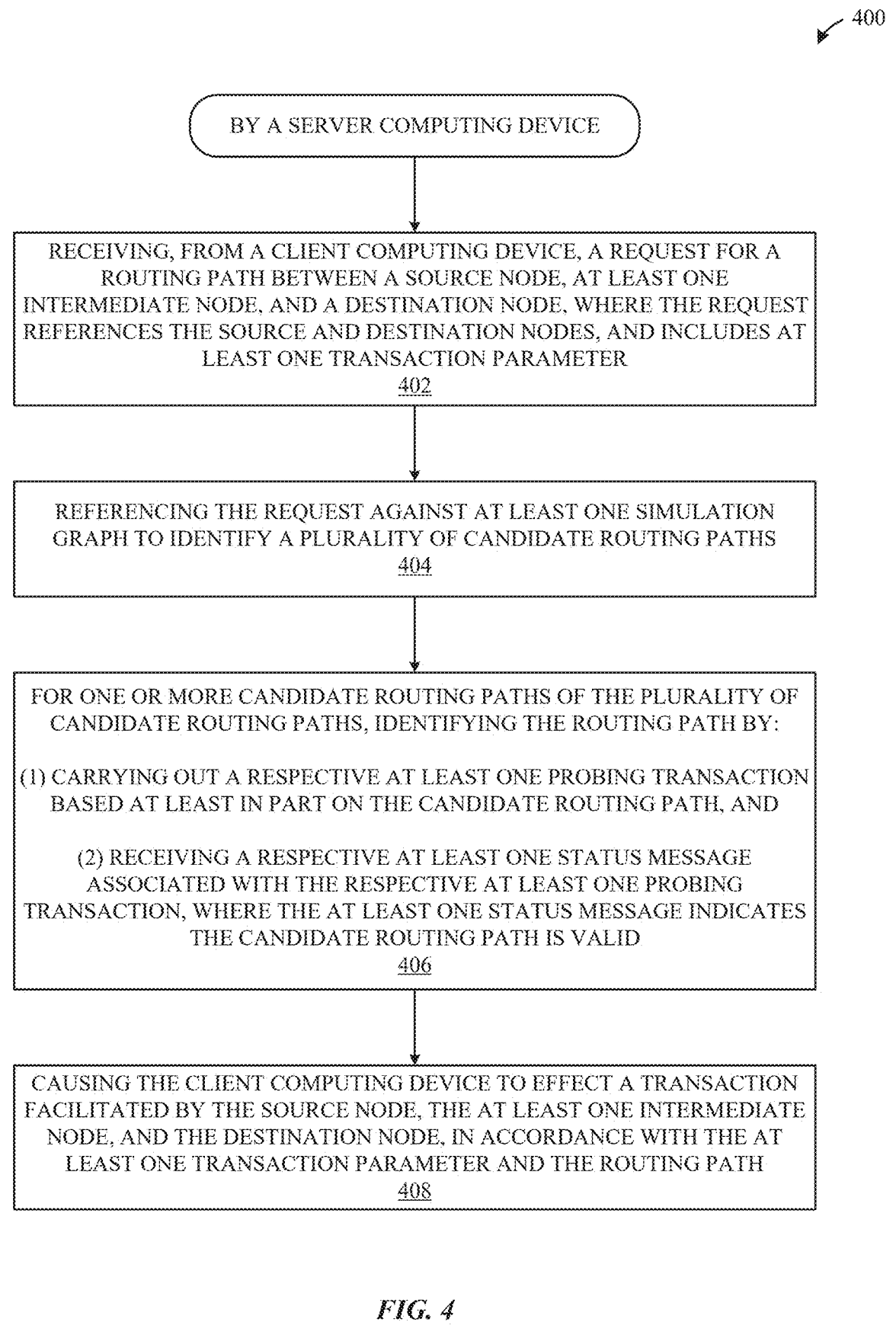

400

BY A SERVER COMPUTING DEVICE

RECEIVING, FROM A CLIENT COMPUTING DEVICE, A REQUEST FOR A ROUTING PATH BETWEEN A SOURCE NODE, AT LEAST ONE INTERMEDIATE NODE, AND A DESTINATION NODE, WHERE THE REQUEST REFERENCES THE SOURCE AND DESTINATION NODES, AND INCLUDES AT LEAST ONE TRANSACTION PARAMETER
402

REFERENCING THE REQUEST AGAINST AT LEAST ONE SIMULATION GRAPH TO IDENTIFY A PLURALITY OF CANDIDATE ROUTING PATHS
404

FOR ONE OR MORE CANDIDATE ROUTING PATHS OF THE PLURALITY OF CANDIDATE ROUTING PATHS, IDENTIFYING THE ROUTING PATH BY:

(1) CARRYING OUT A RESPECTIVE AT LEAST ONE PROBING TRANSACTION BASED AT LEAST IN PART ON THE CANDIDATE ROUTING PATH, AND (2) RECEIVING A RESPECTIVE AT LEAST ONE STATUS MESSAGE ASSOCIATED WITH THE RESPECTIVE AT LEAST ONE PROBING TRANSACTION, WHERE THE AT LEAST ONE STATUS MESSAGE INDICATES THE CANDIDATE ROUTING PATH IS VALID
406

CAUSING THE CLIENT COMPUTING DEVICE TO EFFECT A TRANSACTION FACILITATED BY THE SOURCE NODE, THE AT LEAST ONE INTERMEDIATE NODE, AND THE DESTINATION NODE, IN ACCORDANCE WITH THE AT LEAST ONE TRANSACTION PARAMETER AND THE ROUTING PATH
408

*FIG. 4*

TECHNIQUES FOR IDENTIFYING OPTIMAL ROUTING PATHS FOR PERFORMING TRANSACTIONS BETWEEN NODES

TECHNICAL FIELD

In general, the present disclosure provides techniques for identifying optimal routing paths for performing transactions between nodes.

BACKGROUND

The Lightning Network, which is a second-layer protocol built on top of blockchain technologies such as Bitcoin, has garnered significant attention as a potential solution to Bitcoin's scalability issues. However, the Lightning Network continues to face several challenges that must be addressed for widespread adoption and effectiveness to be achieved.

One of the core challenges facing the Lightning Network revolves around the difficulty of determining channel balances, primarily due to privacy features that are inherently built-in to the operation of the Lightning Network. In the Lightning Network, transactions occur off-chain, meaning they aren't immediately recorded on the Bitcoin blockchain. Instead, participants establish payment channels between themselves, where each payment channel represents a bilateral agreement between two parties, and the balance of the channel is essentially the amount of Bitcoin each party can use to transact within that channel. Unlike on-chain Bitcoin transactions—which are transactions that are publicly visible on the Bitcoin blockchain—channel balances within the Lightning Network (LN) are not readily accessible to external observers.

The lack of transparency in channel balances poses several problems. First, it makes it challenging for users to make informed decisions about the channels through which their payments should be routed. In particular, without visibility into the available liquidity within different channels, users may encounter routing failures or delays, which can result in a less seamless user experience. Moreover, the difficulty in determining channel balances complicates the task of optimizing how payments are routed through the Lightning Network. In particular, efficient routing relies on the availability of up-to-date information about channel capacities and balances to ensure that payments can be successfully routed through a path having sufficient liquidity. However, the private nature of channel balances makes it difficult to obtain this information, potentially leading to suboptimal routing decisions and increased transaction costs.

Addressing the challenges of pathfinding and determining channel balances in a privacy-preserving manner is crucial for enhancing the usability, efficiency, and decentralization of the Lightning Network. Solutions that balance privacy with transparency, such as cryptographic techniques or incentivizing nodes to disclose balance information, may offer potential avenues for overcoming this obstacle. However, finding the right balance between privacy and transparency while preserving the security and efficiency of the Lightning Network remains an ongoing research challenge in the realm of Bitcoin scalability.

Overall, while the Lightning Network holds promise for improving Bitcoin's scalability and usability, addressing the foregoing challenges is important for realizing Bitcoin's full potential.

SUMMARY

In general, the present disclosure provides techniques for identifying optimal routing paths for performing transactions between nodes.

One embodiment sets forth a method for identifying routing paths between nodes. According to some embodiments, the method can be implemented by at least one server computing device, and includes the steps of (1) receiving, from a client computing device, a request for a routing path between a source node, at least one intermediate node, and a destination node, where the request references the source and destination nodes, and includes at least one transaction parameter, (2) referencing the request against at least one simulation graph to identify a plurality of candidate routing paths, (3) identifying the routing path among the plurality of candidate routing paths, and (4) providing the routing path to the client computing device to enable the client computing device to effect a transaction facilitated by the source node, the at least one intermediate node, and the destination node, in accordance with the routing path and the at least one transaction parameter.

According to some embodiments, identifying the routing path comprises, for one or more candidate routing paths of the plurality of candidate routing paths: (1) carrying out a respective at least one probing transaction based at least in part on the candidate routing path, and (2) receiving a respective at least one status message associated with the respective at least one probing transaction, where the at least one status message indicates the candidate routing path is valid.

According to some embodiments, for a given candidate routing path of the plurality of candidate routing paths, carrying out the respective at least one probing transaction based at least in part on the candidate routing path comprises: (1) providing placeholder transaction information to the source node, a respective at least one intermediate node, the destination node, or some combination thereof; and (2) receiving the respective at least one status message associated with the at least one probing transaction, where the respective at least one status message includes a respective at least one error code.

According to some embodiments, the method can further include the step of receiving, from the client computing device, feedback information associated with the transaction, where the feedback information indicates at least whether the transaction was successfully performed.

According to some embodiments, the method can further include the step of updating the at least one simulation graph based on (i) the status messages associated with the probing transactions, (ii) the feedback information, (iii) updated state information received for the source node, the at least one intermediate node, the destination node, or some combination thereof, or (iv) some combination thereof.

According to some embodiments, the method can further include the step of, prior to causing the client computing device to effect the transaction, generating, for the routing path based on the at least one simulation graph, the at least one status message, or some combination thereof: a respective probability of success that indicates an overall likelihood that the transaction will succeed; a respective time estimate that indicates an estimated amount of time that will be needed to complete the transaction; a respective fee estimate that indicates an estimated total of fees that will be charged to complete the transaction; or some combination thereof.

According to some embodiments, the at least one simulation graph includes a plurality of nodes; and each node of the plurality of nodes is associated with: a respective outgoing edge that points the node to a respective different node of the plurality of nodes, a respective incoming edge that points the respective different node of the plurality of nodes to the node, and state information that is shared between the node and the respective different node.

According to some embodiments, the at least one simulation graph comprises a simulacrum of a plurality of payment channels and respective nodes within Lightning Network, each payment channel of the plurality of payment channels corresponds to a respective pair of an incoming edge and an outgoing edge, and the state information for a given payment channel of the plurality of payment channels comprises: available budget information, budget capacity information, fee information, and lock time information.

According to some embodiments, the state information is generated using at least one machine learning model that receives, as input: status messages received in response to carrying out probing transactions and/or indications of successful payment transactions received from client computing devices, update messages periodically received from Lightning Network nodes that form the payment channels, or some combination thereof.

According to some embodiments, the at least one transaction parameter comprises one or more price restrictions, one or more node locale restrictions, one or more lock time restrictions, or some combination thereof.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

Notation and Nomenclature

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 1 illustrates a high-level component diagram of an illustrative system architecture, according to certain embodiments of this disclosure;

FIG. 4 illustrates a method for identifying routing paths between nodes, according to some embodiments.

DETAILED DESCRIPTION

Figure 2:
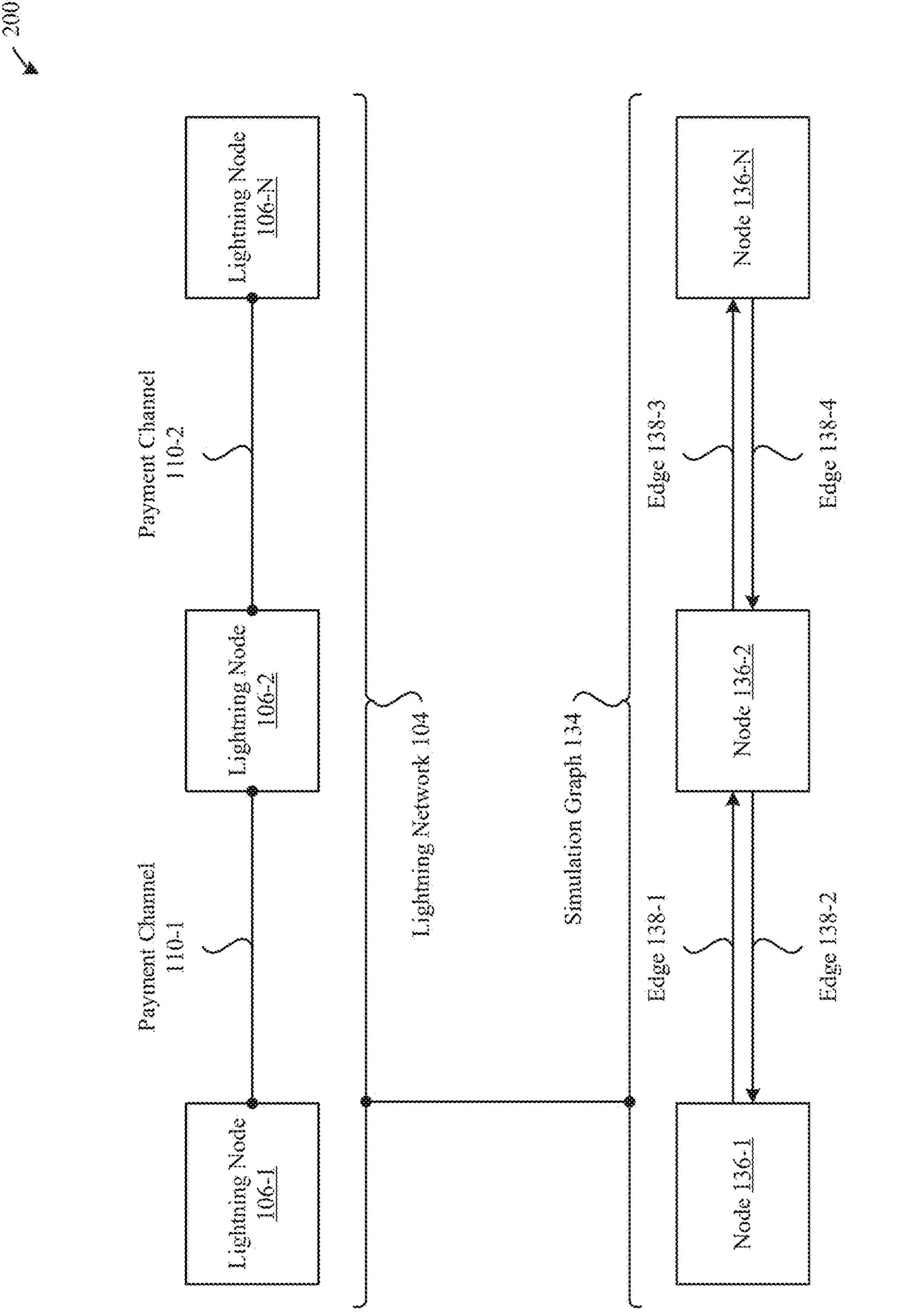
FIG. 2 illustrates a conceptual diagram of how a simulation graph can be used to model at least a portion of the Lightning Network, according to some embodiments.

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The described embodiments set forth techniques for identifying optimal routing paths for performing transactions between nodes.

FIG. 1 illustrates a block diagram of a system 100 that can be configured to implement the different techniques described herein, according to some embodiments. As shown in FIG. 1, the system 100 can include the Lightning Network 104 and one or more Blockchain Networks 102 (e.g., Bitcoin, Litecoin, Liquid, etc.). As a brief aside, a description of these networks, and how they interoperate with one another, will now be provided to aid in the understanding of the techniques described herein.

The Lightning Network is a second-layer protocol built on top of blockchain networks like Bitcoin and Litecoin, and is designed to address some of the scalability issues inherent in these platforms. The Lightning Network operates by creating a network of bidirectional payment channels that allow users to transact directly with each other without involving the underlying blockchain for every transaction. This approach can enable faster and more cost-effective microtransactions to be carried out, while maintaining the security and decentralization of the underlying blockchain.

At its core, the Lightning Network utilizes smart contracts to establish payment channels between users. These payment channels are implemented as multi-signature wallets that require the consent of both parties involved in the transaction to execute any changes to each user's respective balance within the payment channel. To initiate a payment channel, one or both parties commit respective amounts of cryptocurrency (referred to herein as "channel budgets") to the payment channel, which determine the maximum amount that can be transacted within the payment channel (referred to herein as "channel capacity"). Once the payment channel is established, users can conduct an unlimited number of transactions off-chain by updating the balances of the payment channel accordingly.

As described above, the Lightning Network operates on the principle of trustless routing, meaning that users can send payments to others without having to trust intermediaries or third parties. Instead, payments can be routed through a network of interconnected payment channels using a series of smart contracts and cryptographic techniques. This process can improve the security by which funds are transferred from senders to recipients without the need for a centralized authority to verify the transactions.

One of the key features of the Lightning Network is its ability to enable nearly instant transactions. Since payments occur off-chain within payment channels, they can be executed almost instantly, thereby providing a significant improvement over the potentially lengthy confirmation times associated with on-chain transactions. This nearly instant settlement feature makes the Lightning Network well-suited for use cases such as retail payments, micropayments, machine-to-machine payments, and peer-to-peer payments, and the like.

Furthermore, the Lightning Network offers scalability benefits by reducing the burden on the underlying blockchain. By conducting the majority of transactions off-chain, the network alleviates congestion on the main blockchain, thereby allowing it to process a higher volume of transactions more efficiently. This scalability enhancement is crucial for blockchain networks like Bitcoin, which have faced challenges related to limited transaction throughput and rising transaction fees.

In summary, the Lightning Network operates by leveraging payment channels and smart contracts to facilitate trustless and nearly instant transactions off-chain. By providing a scalable solution for micropayments and improving the efficiency of blockchain networks, the Lightning Network has the potential to unlock new use cases and drive broader adoption of cryptocurrencies as a medium of exchange. However, as described herein, several deficiencies persist with respect to the operation of the Lightning Network, such as difficulties in identifying optimal paths, difficulties ascertaining payment channel balances, difficulties in avoiding areas with a high ratio of offline nodes, difficulties in avoiding nodes in sanctioned jurisdictions, difficulties in avoiding nodes with slow response times, etc., which can make it difficult to effectively perform transactions across Lightning Network payment channels. Accordingly, the embodiments described herein are designed to address these deficiencies.

As shown in FIG. 1, the Lightning Network 104 can include a set of Lightning Nodes 106, where each Lightning Node 106 is associated with a Lightning Node identifier 108, and represents an entity (e.g., a computing device, a virtual computing device, etc.) that participates in the Lightning Network 104 (e.g., by implementing protocols, Application Programming Interfaces (APIs), etc., utilized by the Lightning Network 104). Additionally, as shown in FIG. 1, each Lightning Node 106 can implement one or more payment channels 110, where each payment channel 110 is associated with (1) a Lightning Node identifier 108 of a counterpart Lightning Node 106 that participates (with the Lightning Node 106) in the payment channel 110, and (2) state information 114 associated with the payment channel 110. It should be appreciated that other entities, information, etc., can be associated with the Lightning Network 104, the Lightning Nodes 106, the payment channels 110, etc., consistent with the scope of this disclosure.

According to some embodiments, the state information 114 can include a unique identifier (ID) for the payment channel 110 (e.g., a universally unique identifier (UUID) that uniquely identifies the payment channel 110 within the Lightning Network 104). The state information 114 can also include channel balance information for the payment channel 110 (e.g., two balances—one for each endpoint Lightning Node 106 (also referred to herein as "parties") that is a member of the payment channel 110—where the balances are updated with each transaction to reflect the movement of funds between the parties). The state information 114 can also include commitment transaction information for the payment channel 110 (e.g., details about transactions that record the current balances of the payment channel 110 (e.g., transaction IDs, output amounts, the latest commitment transaction number, etc.)).

Additionally, the state information 114 can include revocation information for the payment channel 110 (e.g., data that can be used to enforce a revocable sequence maturity contract (RSMC), including old commitment transaction details that can be used to penalize cheating attempts by either party). The state information 114 can also include funding transaction information for the payment channel 110 (e.g., details about an initial transaction that took place on the Blockchain Network 102 to fund the opening of the payment channel 110 within the Lightning Network 104, including a transaction ID, output amounts, confirmation status(es), and the like).

Additionally, the state information 114 can include lock time information (also referred to herein as "timelock" information) for the payment channel 110 (e.g., details regarding lock times associated with various transactions within the payment channel 110, including CSV (Check Sequence Verify) and CLTV (Check Lock Time Verify) values). The state information 114 can also include routing information for the payment channel 110 (e.g., topology information associated with the Lightning Network 104, payment channel 110 capacity information, etc., which can aid in routing payments through the Lightning Network 104). The state information 114 can also include policy information for the payment channel 110 (e.g., policies regarding fees (e.g., whether the Lightning Nodes 106 are non-profit nodes, for-profit nodes, etc.), minimum and maximum payment amounts, and other parameters that govern the payment channel 110).

Additionally, the state information 114 can include error and state change handling information for the payment channel 110 (e.g., details about mechanisms for handling errors and state changes, to help promote payment channel 110 functionality and security under different circumstances). The state information 114 can also include locale information associated with the payment channel 110 (e.g., geographical, logical, etc., locations of the Lightning Nodes 106 associated with the payment channel 110). It is noted that the foregoing examples are not meant to be limiting, and that the state information 114 can include any amount, type, form, etc., of information relating to the payment channel 110, the Lightning Nodes 106 associated with the payment channel, etc., at any level of granularity, consistent with the scope of this disclosure.

As shown in FIG. 1, the Lightning Network 104 can also include one or more routing nodes 116. According to some embodiments, each routing node 116 can be configured to facilitate the transfer of payments between different Lightning Nodes 106. In this regard, and as described in greater detail herein, the server computing devices 130 can effectively function as routing nodes 116 within the Lightning Network 104 that provide routing paths to client computing devices 150.

As shown in FIG. 1, the system 100 can include one or more server computing devices 130 and one or more client computing devices 150. According to some embodiments, the server computing device 130 can implement a routing engine 132, one or more simulation graphs 134, and one or more machine learning models 142. As described herein, the routing engine 132 can be configured to receive, from a given client computing device 150, a request for a routing path that can be used to perform, using the Lightning Network 104, a transaction between a source Lightning Node 106, at least one intermediate Lightning Node 106, and a destination Lightning Network 104, in accordance with transaction criteria specified by the client computing device 150. However, as described herein, information that is useful to effectively, efficiently, etc., perform the transaction-such as available Lightning Nodes 106, payment channels 110, etc.—can be difficult to ascertain due to the highly dynamic, private, etc., manners in which Lightning Nodes 106 and payment channels 110 are operated and updated under the Lightning Network 104. In this regard, it can be difficult, at least by utilizing conventional approaches, to identify a routing path that can be used to effectively and efficiently carry out the transaction.

According to some embodiments, the routing engine 132 can be configured to mitigate, at least in part, the foregoing difficulties, by generating, maintaining, utilizing, etc., at least one simulation graph 134 that functions as a model of how Lightning Nodes 106 and payment channels 110 may be organized within the Lightning Network 104. According to some embodiments, the simulation graph 134 can be implemented using one or more data structures that are suitable, appropriate, optimized, etc., for representing nodes, edges, state information, etc., such as an adjacency list, an adjacency matrix, an incidence list, or the like. For example, product offerings by Memgraph can be configured, optimized, etc., to effectively model the Lightning Nodes 106 and payment channels 110 within the Lightning Network 104. It is noted that the foregoing examples are not meant to be limiting, and that any number, type, form, etc., of data structure(s) can be utilized to implement the simulation graph(s) 134, at any level of granularity, consistent with the scope of this disclosure.

As shown in the conceptual diagram 200 of FIG. 2, nodes 136 within the simulation graph 134 can correspond to Lightning Nodes 106 within the Lightning Network 104, and edges 138 within the simulation graph 134 can correspond to payment channels 110 between the Lightning Nodes 106. As shown in FIG. 2, for a given payment channel 110 that exists between two Lightning Nodes 106, two separate and distinct edges 138 can be established between nodes 136 (that correspond to the two Lightning Nodes 106), where each edge points in an opposing direction. Notably, utilizing two separate and distinct edges 138 (that point in opposing directions) to represent a given payment channel 110 can be beneficial because differing balances, fee structures, etc., can be associated with the Lightning Nodes 106 (modeled by the nodes 136), which would otherwise be difficult to analyze, exploit, etc., using a single/bi-directional edge 138.

It should be appreciated that the state information 114 for a given payment channel 110 modeled within the simulation graph 134 can be represented by state information 140 (not illustrated in FIG. 2) that is associated with the nodes 136, edges 138, etc., so that the state information 140 can enable the routing engine 132 to effectively identify routing paths. Additionally, it should be appreciated the conceptual diagram 200 of FIG. 2 is simplified to aid the understanding of this disclosure, and that the simulation graph 134 can incorporate any number of nodes 136, edges 138, and state information 140 to effectively model the Lightning Nodes 106, payment channels 110, and state information 114, respectively, included in the Lightning Network 104. It should also be appreciated that a given Lightning Node 106 (and corresponding node 136) is not limited to supporting a single payment channel 110 (and corresponding edges 138), and that the Lightning Node 106 (and corresponding node 136) can support any number of payment channels 110 (and corresponding edges 138), consistent with the scope of this disclosure.

According to some embodiments, the simulation graph 134 can be generated, maintained, etc., by obtaining information about Lightning Nodes 106, payment channels 110, etc., e.g., by querying the aforementioned entities, by receiving information from the aforementioned entities, by receiving crowd-sourced information about the aforementioned entities (e.g., "gossip" information), and so on. The simulation graph 134 can also be generated, maintained, etc., by issuing probing transactions to the Lightning Nodes 106/payment channels 110, to provoke response messages (e.g., status messages, error messages, etc.) that can be utilized to gather, infer, etc., information about the aforementioned entities. It is noted that the foregoing examples are not meant to be limiting, and that the simulation graph 134 can be generated, maintained, etc., using any amount, type, form, etc., of information (received using any approach), at any level of granularity, consistent with the scope of this disclosure.

According to some embodiments, the routing engine 132 can be configured to generate, maintain, utilize, etc., the machine learning models 142 described herein. According to some embodiments, a given machine learning model 142 can be implemented as a Random Forest Regression (RFR) model. In other embodiments, a given machine learning model 142 can be implemented as a Graph Neural Network (GNN). As a brief aside, it is noted that other machine learning models 142 can be implemented, such as small language models (SLMs), large language models (LLMs), rule-based models, traditional machine learning models, custom models, ensemble models, knowledge graph models, hybrid models, domain-specific models, sparse models, transfer learning models, symbolic artificial intelligence (AI) models, generative adversarial network models, reinforcement learning models, biological models, and so on. It is noted that the foregoing examples are not meant to be limiting, and that any number, type, form, etc., of AI model(s), can be implemented by the server computing devices 130 (or other entities with which the server computing devices 130 interface), consistent with the scope of this disclosure. It is further noted that the techniques described herein that are implemented by the machine learning models 142 can also be implemented using non-AI-based approaches, such as rules-based systems, knowledge-based systems, and so on, consistent with the scope of this disclosure.

According to some embodiments, the machine learning models 142 can be trained based on any of the above-described information that is used to generate, maintain, etc., the simulation graphs 134, e.g., information about Lightning Nodes 106, payment channels 110, etc., that is publicly accessible (e.g., by querying the aforementioned entities, by receiving notifications from the aforementioned entities, by receiving crowd-sourced information about the aforementioned entities (e.g., "gossip" information), etc.), information obtained through probing transactions to the Lightning Nodes 106/payment channels 110 (e.g., status messages, error messages, etc., provided in response to the proving transactions), and so on. It is noted that the foregoing examples are not meant to be limiting, and that the machine learning models 142 can be trained using any amount, type, form, etc., of information, at any level of granularity, consistent with the scope of this disclosure.

According to some embodiments, the machine learning models 142 can be used to supplement, inform, etc., the information stored within the simulation graphs 134. For example, the machine learning models 142 can be used to improve the overall accuracy by which the simulation graph 134 represents the Lightning Nodes 106, payment channels 110, and state information 140 associated with the Lightning Network 104 (as simulated by the nodes 136, edges 138, state information 140, etc., included in the simulation graph 134).

According to some embodiments, the machine learning models 142 can also be utilized to parse, analyze, navigate, etc., the simulation graph 134. For example, based on one or more inputs included in a request for a routing path to perform a transaction—such as a source Lightning Node 106, a destination Lightning Node 106, and at least one transaction parameter (that defines properties of a transaction to be performed between the source Lightning Node 106, at least one intermediate Lightning Node 106, and the destination Lightning Node 106)—the machine learning model 142 can provide an output that correlates to the simulation graph 134 and enables the routing engine 132 to efficiently identify one or more candidate routing paths. It should be appreciated that the techniques described herein can also apply to scenarios where a routing path does involve at least one intermediate Lightning Node 106, consistent with the scope of this disclosure.

It should be appreciated, however, that the simulation graph 134 can be parsed, analyzed, navigated, etc., to identify candidate routing paths without directly utilizing the machine learning model 142. Under such an approach, the utilization of the machine learning model 142 can instead be focused on maintaining the overall accuracy of the simulation graph 134 relative to the Lightning Network 104. For example, the machine learning model 142 can be utilized to predict, to a considerably accurate degree, balances for payment channels 110 that are modeled within the simulation graph 134. As a result, the overall accuracy of the simulation graph 134 is increased, which correspondingly increases the overall quality of candidate routing paths that are derived from the simulation graph 134. It is noted that the machine learning model 142 is not limited to predicting payment channel 110 balances, and that the machine learning model 142 can be used to predict, derive, etc., any of the state information 114 discussed herein, consistent with the scope of this disclosure.

In any case—and, as described below in greater detail in conjunction with FIGS. 3-4—the routing engine 132 can, in response to a request received from a client computing device 150 to provide a routing path for a particular transaction, identify one or more candidate routing paths. According to some embodiments, the routing engine 132 can identify, within the simulation graph 134, a source node 136 and a destination node 136 that correspond to a source Lightning Node 106 and a destination Lightning Node 106, respectively, that are referenced by the client computing device 150 in the request to provide the routing path for the particular transaction.

In turn, the routing engine 132 can parse, analyze, etc., the simulation graph 134 to identify one or more candidate routing paths that include one or more intermediate nodes 136 (that correspond to intermediate Lightning Nodes 106) that may enable the transaction to be carried out in an effective manner. According to some embodiments, the routing engine 132 can select a threshold number of candidate routing paths that refer to the fewest number of intermediate Lightning Nodes 106 in the interest of selecting candidate routing paths that may enable the transaction to be executed more efficiently. The routing engine 132 can also be configured to filter out candidate routing paths that refer to Lightning Nodes 106, payment channels 110, etc., that are unacceptable in view of constraints (e.g., Lightning Node 106 locale constraints, operating mode constraints, etc.) to the particular transaction that are specified by the client computing device 150. It is noted that the foregoing examples are not meant to be limiting, and that the routing engine 132 can select candidate routing paths based on any amount, type, form, etc., of information, at any level of granularity, consistent with the scope of this disclosure.

As previously described herein, the simulation graph 134 may include discrepancies relative to the actual layout, state, etc., of the Lightning Network 104, as a consequence of information that is otherwise non-public (and therefore must be inferred, predicted, etc., in accordance with the techniques described herein), the considerable speed at which the Lightning Network 104 evolves (e.g., Lightning Nodes 106/payment channels 110 going offline/coming online, state information 114 of payment channels 110 changing (e.g., as transactions are performed, polices are modified, etc.)), and so on. Consequently, the candidate routing paths, when utilized (at least in part) to perform, guide, etc., the transaction within the Lightning Network 104, may be invalid, out-of-date, and so on, such that they are ineffective for successfully carrying out the transaction.

In view of these considerations, the routing engine 132 can be configured to identify, for a given candidate routing path, a probability that the transaction will succeed if the candidate routing path were to be used to perform the transaction. To achieve this end, the routing engine 132 can be configured to issue one or more probing transactions to one or more of the Lightning Nodes 106 that are logically disposed along the candidate routing path. According to some embodiments, each probing transaction can include instructions to perform a fictitious transaction between two endpoints (i.e., a source Lightning Node 106 and a destination Lightning Node 106) associated with a given payment channel 110 that is disposed along the candidate routing path. For example, a probing transaction may include invalid security information (e.g., invalid pre-image information, invalid hash information, etc.), invalid price information, invalid address information, etc., which causes the probing transaction to fail and provokes one or more error messages to be returned (e.g., by the Lightning Node 106 that received the probing transaction).

The error messages can include, for example, a temporary channel failure error message, which indicates there is a temporary issue with the payment channel 110, such as insufficient funds or a routing problem, and which provides a recommendation to wait and retry the transaction later. The error messages can also include a permanent channel failure error message, which indicates a more serious issue with the payment channel 110, such as the payment channel 110 being closed or the counterparty being unresponsive. Remedying this scenario typically requires intervention, such as creating a different payment channel 110, restarting Lightning Nodes 106, closing and reopening the payment channel 110, and the like.

Additionally, the error messages can include an insufficient fee error message, which indicates that the fee provided for routing/processing the payment is insufficient, and usually requires increasing the fee to resolve the issue. The error messages can also include a route not found error message, which is returned when a suitable route cannot be identified to perform the transaction (e.g., due to insufficient liquidity along the routing path, routing restrictions, etc.). The error messages can also include an unknown payment hash error message, which suggests that the provided payment hash does not correspond to any known payment (which typically arises due to a mistake in the hash, attempting to pay an invoice that has expired, etc.). The error messages can also include an amount too large error message, which indicates that the amount specified in the payment request exceeds the maximum amount allowed for a single transaction. The error messages can also include an unknown payment secret, which indicates that the payment secret provided does not match the expected value for the payment hash.

Additionally, the error messages can include a temporary node failure error message, which indicates a temporary issue with a Lightning Node 106, such as being offline or experiencing technical difficulties. The error messages can also include a permanent node failure error message, which indicates a more serious and persistent issue with the Lightning Node 106, such as a permanent unavailability of the Lightning Node 106 (where an alternative route may be required to complete the transaction). The error messages can also include an expired channel error message, which occurs when attempting to use a payment channel 110 that has expired or has been closed. It is noted that the foregoing examples are not meant to be limiting, and that the error messages can include any amount, type, form, etc., of information, at any level of granularity, consistent with the scope of this disclosure.

As a brief aside, it should be appreciated that the routing engine 132 can perform other techniques (e.g., in addition to performing probing transactions/analyzing error messages, as described herein) to increase the overall accuracy of the probability that is calculated for the candidate routing path. For example, the routing engine 132 can be configured to query relevant Lightning Nodes 106 (e.g., those that are logically disposed along the candidate routing path) for up-to-date state information 114, to analyze updates about the Lightning Nodes 106 (e.g., received from the Lightning Nodes 106, from crowd-sourcing entities, etc.), etc., that have yet to be reflected in the simulation graph 134/machine learning model 142, and so on. It is noted that the foregoing examples are not meant to be limiting, and that any amount, type, form, etc., of technique(s) can be implemented, at any level of granularity, to accurately identify a probability that a given candidate routing path will succeed if/when utilized to perform a transaction, consistent with the scope of this disclosure.

In any case, the routing engine 132 can be configured to receive and process the error messages (e.g., using the machine learning model 142) to identify an overall probability that the transaction will succeed if the candidate routing path were to be used to perform the transaction. According to some embodiments, the routing engine 132 can supplement the candidate routing path with information about the probing transactions that were performed, the error messages that were received (in conjunction with the probing transactions), and so on. The routing engine 132 can then provide, as inputs to the machine learning model 142, the candidate routing path, the transaction (provided by the client computing device 150), and any other relevant information, to cause the machine learning model 142 to output a probability metric that represents an overall likelihood that the candidate routing path will succeed if utilized in attempt to perform the transaction. For example, the probability metric can be based on the largest minimum balance across the series of Lightning Nodes 106 that would be involved in the direction of the payment. In this manner, the routing engine 132 can process one or more of the candidate routing paths (in accordance with the techniques described herein) to identify at least one candidate routing path, if any, that satisfies a threshold level of probability (e.g., ninety (90%)).

When the routing engine 132 has established probabilities for one or more of the candidate routing paths, the routing engine 132 can then provide the candidate routing paths to the client computing device 150. In turn, the client computing device 150 can utilize the candidate routing paths (e.g., in order of highest to lowest probability) until the transaction is successfully executed. Optionally, the client computing device 150 can provide, to the routing engine 132, feedback information associated with how the candidate routing paths performed with respect to effectively carrying out the transaction. For example, the feedback information can include information that was identified by the client computing devices 150 (e.g., about Lightning Nodes 106/payment channels 110), error messages received (e.g., from Lightning Nodes 106), and so on. In turn, the routing engine 132 can update the simulation graph 134 based on the feedback information to improve its overall correspondence to the Lightning Network 104. The routing engine 132 can also update (e.g., train, fine-tune, etc.) the machine learning models 142 based on the feedback information to improve the overall accuracy by which they generate predictions for candidate routing paths. It is noted that the foregoing examples are not meant to be limiting, and that the routing engine 132 can be configured to update, enhance, etc., the simulation graphs 134, the machine learning models 142, etc., based on any amount, type, form, etc., of information, at any level of granularity, consistent with the scope of this disclosure.

Figure 3:
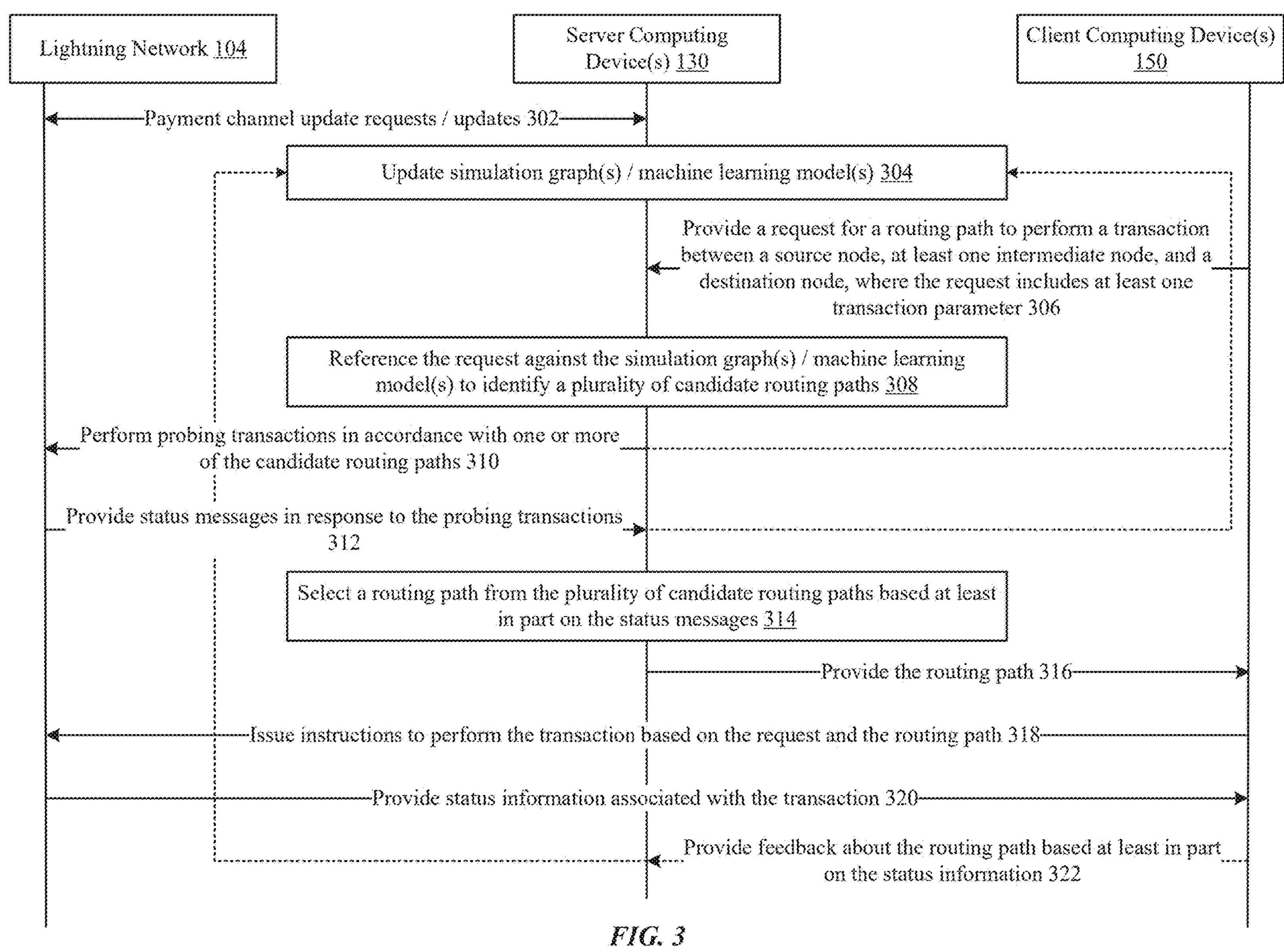
FIG. 3 illustrates a sequence diagram for identifying routing paths between nodes, according to some embodiments.

FIG. 3 illustrates a sequence diagram for identifying routing paths between nodes, according to some embodiments. As shown in FIG. 3, the sequence diagram begins at step 302, where the Lightning Network 104 and the server computing devices 130 process update requests/updates to the payment channels 110 (e.g., as described above in conjunction with FIGS. 1-2). At step 304, the server computing device 130 updates the simulation graph(s) 134 machine learning model(s) 142 (e.g., as described above in conjunction with FIGS. 1-2).

At step 306, a client computing device 150 provides, to the server computing device 130, a request for a routing path to perform a transaction between a source Lightning Node 106, at least one intermediate Lightning Node 106, and a destination Lightning Node 106, where the request includes at least one transaction parameter (e.g., as described above in conjunction with FIGS. 1-2).

At step 308, the server computing device 130 references the request against the simulation graph(s) 134 machine learning model(s) 142 to identify a plurality of candidate routing paths (e.g., as described above in conjunction with FIGS. 1-2). At step 310, the server computing device 130 performs probing transactions in accordance with one or more of the candidate routing paths (e.g., as described above in conjunction with FIGS. 1-2). In particular, and as previously described herein, the server computing device 130 issues the probing transactions to one or more of the Lightning Nodes 106 that are logically disposed along the candidate routing paths. As shown in FIG. 3, information about the probing transactions can be stored/managed, so that when results from the probing transactions are received (as described below at step 312), the information/results can optionally be analyzed to update the simulation graph 134 where appropriate.

At step 312, the Lightning Network 104—specifically, the aforementioned Lightning Nodes 106 that receive the probing transactions—provide status messages in response to the probing transactions (e.g., as described above in conjunction with FIGS. 1-2). At step 314, the server computing device 130 selects a routing path from the plurality of candidate routing paths based at least in part on the status messages (e.g., as described above in conjunction with FIGS. 1-2).

At step 316, the server computing device 130 provides the routing path to the client computing device 150 (e.g., as described above in conjunction with FIGS. 1-2). At step 318, the client computing device 150 issues, to the Lightning Network 104—e.g., to one or more of the Lightning Nodes 106 that are logically disposed along the routing path—instructions to perform the transaction based on the request and the routing path (e.g., as described above in conjunction with FIGS. 1-2). At step 320, the Lightning Network 104—i.e., one or more of the Lightning Nodes 106 that are logically disposed along the routing path—provides, to the client computing device 150, status information associated with the transaction (e.g., as described above in conjunction with FIGS. 1-2).

At step 322, the client computing device 150 optionally provides, to the server computing device 130, feedback about the routing path based at least in part on the status information (e.g., as described above in conjunction with FIGS. 1-2). The feedback information can indicate, for example, information about probing transactions/status messages, information about successful payments, and the like. In turn, the server computing device 130 can update the simulation graph(s) 134 machine learning model(s) 142 based on the feedback information in accordance with the techniques described herein (e.g., as described above in conjunction with FIGS. 1-2). For example, feedback information about successful transactions can be used to adjust channel balances, where appropriate, within the simulation graph 134.

FIG. 4 illustrates a method 400 for identifying routing paths between nodes, according to some embodiments. As shown in FIG. 4, the method 400 begins at step 402, where the server computing device 130 receives, from a client computing device, a request for a routing path between a source node, at least one intermediate node, and a destination node, where the request references the source and destination nodes, and includes at least one transaction parameter (e.g., as described above in conjunction with FIGS. 1-3).

At step 404, the server computing device 130 references the request against at least one simulation graph to identify a plurality of candidate routing paths (e.g., as described above in conjunction with FIGS. 1-3).

At step 406, the server computing device 130 identifies the routing path by performing the following steps for one or more candidate routing paths of the plurality of candidate routing paths: (1) carrying out a respective at least one probing transaction based at least in part on the candidate routing path, and (2) receiving a respective at least one status message associated with the respective at least one probing transaction, where the at least one status message indicates the candidate routing path is valid (e.g., as described above in conjunction with FIGS. 1-3).

At step 408, the server computing device 130 causes the client computing device to effect a transaction facilitated by the source node, the at least one intermediate node, and the destination node, in accordance with the at least one transaction parameter and the routing path (e.g., as described above in conjunction with FIGS. 1-3).

Figure 5:
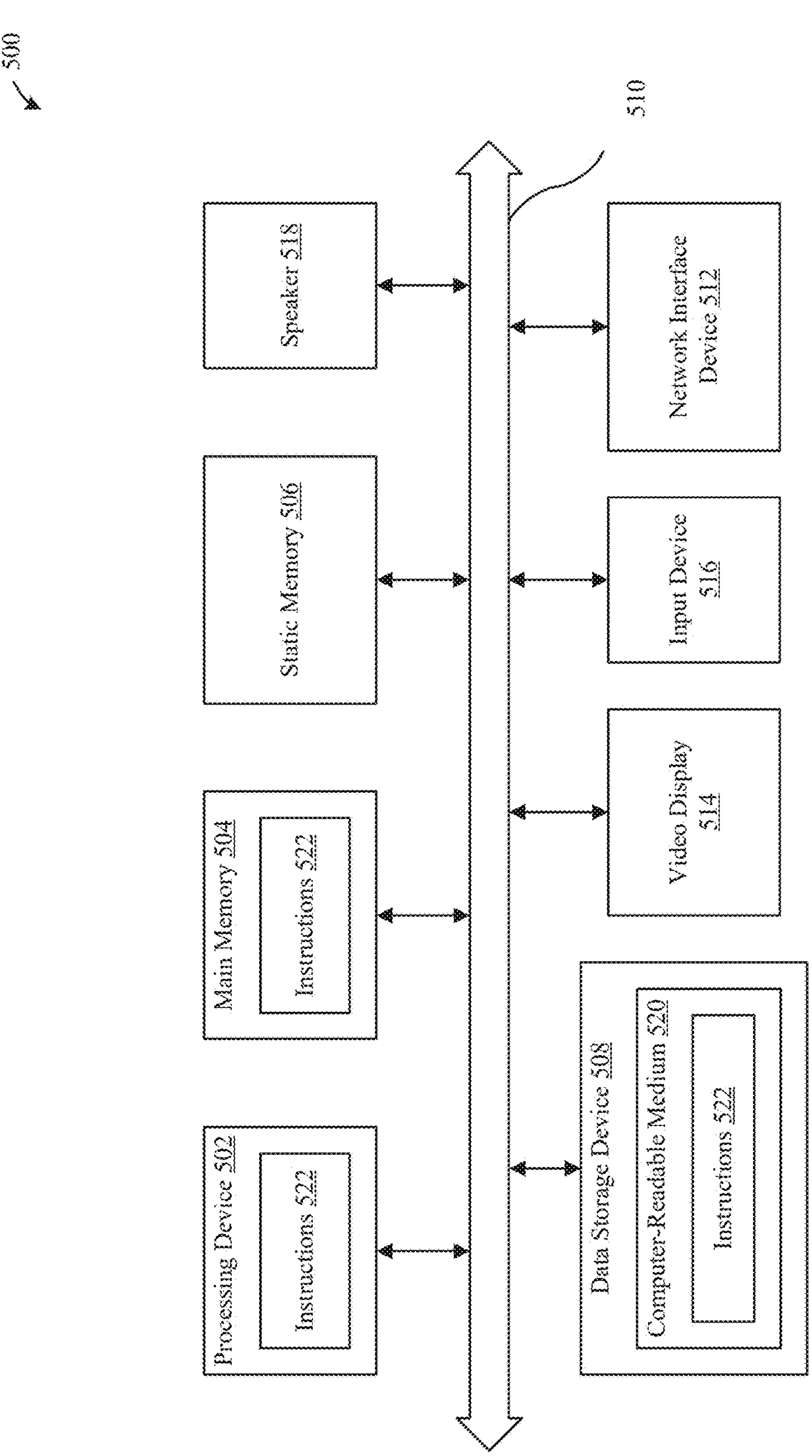
FIG. 5 illustrates an example computer system according to certain embodiments of this disclosure.

FIG. 5 illustrates example computer system 500 which can perform any one or more of the methods described herein, in accordance with one or more aspects of the present disclosure. In one example, computer system 500 can correspond to a Lightning Node 106, a routing node 116, a server computing device 130, a client computing device 150, any computing devices involved in the operation of the Lightning Network 104/Blockchain Network 102, and/or the like, of FIG. 1. In this regard, when the computer system 500 represents the server computing device 130 of FIG. 1, the computer system 500 can be capable of executing, for example, the routing engine 132, the simulation graph 134, the machine learning model 142, etc., of FIG. 1. The computer system can be connected (e.g., networked) to other computer systems in a LAN, an intranet, an extranet, or the Internet. The computer system can operate in the capacity of a server in a client-server network environment. The computer system can be a personal computer (PC), a tablet computer, a wearable (e.g., wristband), a set-top box (STB), a personal Digital Assistant (PDA), a mobile phone, a camera, a video camera, an electronic device identification sensor, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

As shown in FIG. 5, the computer system 500 can includes a processing device 502, a main memory 504 (e.g., read-only memory (ROM), flash memory, dynamic random-access memory (DRAM) such as synchronous DRAM (SDRAM)), a static memory 506 (e.g., solid state drive (SSD), flash memory, static random-access memory (SRAM)), and a data storage device 508, which communicate with each other via a bus 510.

Processing device 502 represents one or more general-purpose processing devices such as a microprocessor, central processing unit, or the like. More particularly, the processing device 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions for performing any of the operations and steps discussed herein.

The computer system 500 can further include a network interface device 512. The computer system 500 also can include a video display 514 (e.g., a liquid crystal display (LCD) or a cathode ray tube (CRT)), one or more input devices 516 (e.g., a keyboard and/or a mouse), and one or more speakers 518 (e.g., a speaker). In one illustrative example, the video display 514 and the input device(s) 516 can be combined into a single component or device (e.g., an LCD touch screen).

The data storage device 508 can include a computer-readable medium 520 on which the instructions 522 (e.g., implementing control system, user portal, clinical portal, and/or any functions performed by any device and/or component depicted in the FIGS. and described herein) embodying any one or more of the methodologies or functions described herein is stored. The instructions 522 can also reside, completely or at least partially, within the main memory 504 and/or within the processing device 502 during execution thereof by the computer system 500. As such, the main memory 504 and the processing device 502 also constitute computer-readable media. The instructions 522 can further be transmitted or received over a network via the network interface device 512.

While the computer-readable storage medium 520 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

The various aspects, embodiments, implementations, or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

What is claimed is:

1. A method for identifying routing paths between nodes, the method comprising, by at least one server computing device:

receiving, from a client computing device, a request for a routing path between a source node, at least one intermediate node, and a destination node, wherein the request references the source and destination nodes, and includes at least one transaction parameter;

referencing the request against at least one simulation graph to identify a plurality of candidate routing paths;

identifying the routing path among the plurality of candidate routing paths; and providing the routing path to the client computing device to enable the client computing device to effect a transaction facilitated by the source node, the at least one intermediate node, and the destination node, in accordance with the routing path and the at least one transaction parameter.

2. The method of claim 1, wherein identifying the routing path comprises, for one or more candidate routing paths of the plurality of candidate routing paths:

carrying out a respective at least one probing transaction based at least in part on a candidate routing path selected from the one or more candidate routing paths, and receiving a respective at least one status message associated with the respective at least one probing transaction, wherein the at least one status message indicates the candidate routing path is valid.

3. The method of claim 2, wherein, for the candidate routing path of the plurality of candidate routing paths, carrying out the respective at least one probing transaction based at least in part on the candidate routing path comprises:

providing placeholder transaction information to the source node, a respective at least one intermediate node, the destination node, or some combination thereof; and receiving the respective at least one status message associated with the at least one probing transaction, wherein the respective at least one status message includes a respective at least one error code.

4. The method of claim 3, further comprising:

receiving, from the client computing device, feedback information associated with the transaction, wherein the feedback information indicates at least whether the transaction was successfully performed.

5. The method of claim 4, further comprising:

updating the at least one simulation graph based on (i) the status messages associated with the probing transactions, (ii) the feedback information, (iii) updated state information received for the source node, the at least one intermediate node, the destination node, or some combination thereof, or (iv) some combination thereof.

6. The method of claim 2, further comprising, prior to causing the client computing device to effect the transaction:

generating, for the routing path based on the at least one simulation graph, the at least one status message, or some combination thereof:

a respective probability of success that indicates an overall likelihood that the transaction will succeed;

a respective time estimate that indicates an estimated amount of time that will be needed to complete the transaction;

a respective fee estimate that indicates an estimated total of fees that will be charged to complete the transaction; or some combination thereof.

7. The method of claim 1, wherein:

the at least one simulation graph includes a plurality of nodes; and each node of the plurality of nodes is associated with:

a respective outgoing edge that points the node to a respective different node of the plurality of nodes, a respective incoming edge that points the respective different node of the plurality of nodes to the node, and state information that is shared between the node and the respective different node.

8. The method of claim 7, wherein:

the at least one simulation graph comprises a simulacrum of a plurality of payment channels and respective nodes within a Lightning Network, each payment channel of the plurality of payment channels corresponds to a respective pair of an incoming edge and an outgoing edge, and the state information for a given payment channel of the plurality of payment channels comprises:

available budget information, budget capacity information, fee information, and lock time information.

9. The method of claim 8, wherein the state information is generated using at least one machine learning model that receives, as input:

status messages received in response to carrying out probing transactions and/or indications of successful payment transactions received from client computing devices, update messages periodically received from Lightning Network nodes that form the payment channels, or some combination thereof.

10. The method of claim 1, wherein the at least one transaction parameter comprises one or more price restrictions, one or more node locale restrictions, one or more lock time restrictions, or some combination thereof.

11. At least one non-transitory computer readable storage medium configured to store instructions that, when executed by at least one processor included in a server computing device, cause the server computing device to identify routing paths between nodes, by carrying out steps that include:

receiving, from a client computing device, a request for a routing path between a source node, at least one intermediate node, and a destination node, wherein the request references the source and destination nodes, and includes at least one transaction parameter;

referencing the request against at least one simulation graph to identify a plurality of candidate routing paths;

identifying the routing path among the plurality of candidate routing paths; and providing the routing path to the client computing device to enable the client computing device to effect a transaction facilitated by the source node, the at least one intermediate node, and the destination node, in accordance with the routing path and the at least one transaction parameter.

12. The at least one non-transitory computer readable storage medium of claim 11, wherein identifying the routing path comprises, for one or more candidate routing paths of the plurality of candidate routing paths:

carrying out a respective at least one probing transaction based at least in part on a candidate routing path selected from the one or more candidate routing paths, and receiving a respective at least one status message associated with the respective at least one probing transaction, wherein the at least one status message indicates the candidate routing path is valid.

13. The at least one non-transitory computer readable storage medium of claim 12, wherein, for the candidate routing path of the plurality of candidate routing paths, carrying out the respective at least one probing transaction based at least in part on the candidate routing path comprises:

providing placeholder transaction information to the source node, a respective at least one intermediate node, the destination node, or some combination thereof; and receiving the respective at least one status message associated with the at least one probing transaction, wherein the respective at least one status message includes a respective at least one error code.

14. The at least one non-transitory computer readable storage medium of claim 13, wherein the steps further include:

receiving, from the client computing device, feedback information associated with the transaction, wherein the feedback information indicates at least whether the transaction was successfully performed.

15. The at least one non-transitory computer readable storage medium of claim 14, wherein the steps further include:

updating the at least one simulation graph based on (i) the status messages associated with the probing transactions, (ii) the feedback information, (iii) updated state information received for the source node, the at least one intermediate node, the destination node, or some combination thereof, or (iv) some combination thereof.

16. The at least one non-transitory computer readable storage medium of claim 12, wherein the steps further include, prior to causing the client computing device to effect the transaction:

generating, for the routing path based on the at least one simulation graph, the at least one status message, or some combination thereof:

a respective probability of success that indicates an overall likelihood that the transaction will succeed;

a respective time estimate that indicates an estimated amount of time that will be needed to complete the transaction;

a respective fee estimate that indicates an estimated total of fees that will be charged to complete the transaction; or some combination thereof.

17. The at least one non-transitory computer readable storage medium of claim 11, wherein:

the at least one simulation graph includes a plurality of nodes; and each node of the plurality of nodes is associated with:

a respective outgoing edge that points the node to a respective different node of the plurality of nodes, a respective incoming edge that points the respective different node of the plurality of nodes to the node, and state information that is shared between the node and the respective different node.

18. The at least one non-transitory computer readable storage medium of claim 17, wherein:

the at least one simulation graph comprises a simulacrum of a plurality of payment channels and respective nodes within Lightning Network, each payment channel of the plurality of payment channels corresponds to a respective pair of an incoming edge and an outgoing edge, and the state information for a given payment channel of the plurality of payment channels comprises:

available budget information, budget capacity information, fee information, and lock time information.

19. The at least one non-transitory computer readable storage medium of claim 18, wherein the state information is generated using at least one machine learning model that receives, as input:

status messages received in response to carrying out probing transactions and/or indications of successful payment transactions received from client computing devices, update messages periodically received from Lightning Network nodes that form the payment channels, or some combination thereof.

20. A server computing device configured to identify routing paths between nodes, the server computing device:

at least one processor; and at least one memory storing instructions that, when executed by the at least one processor, cause the computing device to carry out steps that include:

receiving, from a client computing device, a request for a routing path between a source node, at least one intermediate node, and a destination node, wherein the request references the source and destination nodes, and includes at least one transaction parameter;

referencing the request against at least one simulation graph to identify a plurality of candidate routing paths;

identifying the routing path among the plurality of candidate routing paths; and providing the routing path to the client computing device to enable the client computing device to effect a transaction facilitated by the source node, the at least one intermediate node, and the destination node, in accordance with the routing path and the at least one transaction parameter.

* * * * *